(12) United States Patent
Li et al.

(10) Patent No.: US 11,796,757 B2
(45) Date of Patent: Oct. 24, 2023

(54) LENS ASSEMBLY

(71) Applicant: AAC Optics Solutions Pte. Ltd., Singapore (SG)

(72) Inventors: Linzhen Li, Shenzhen (CN); Jiliang Lu, Shenzhen (CN); Gang Li, Shenzhen (CN); Jin Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 720 days.

(21) Appl. No.: 16/939,088

(22) Filed: Jul. 27, 2020

(65) Prior Publication Data

US 2020/0379208 A1   Dec. 3, 2020

Related U.S. Application Data

(63) Continuation of application No. PCT/CN2019/089714, filed on Jun. 1, 2019.

(51) Int. Cl.
G02B 7/09 (2021.01)
G02B 27/64 (2006.01)

(52) U.S. Cl.
CPC ............. G02B 7/09 (2013.01); G02B 27/646 (2013.01)

(58) Field of Classification Search
CPC ...... G02B 27/646; G02B 6/3514; G02B 7/08; G02B 7/09; G02B 7/182; G02B 15/173; G02B 15/14; G02B 15/177; G02B 15/22; G02B 15/16; G02B 13/18; G02B 13/009; G02B 27/64; G02B 13/02; G02B 7/04; G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065; G02B 15/10; G02B 15/163; G02B 15/167; G02B 23/02; G02B 7/02; G02B 7/022; G02B 7/102; G02B 7/14; G02B 9/04; G02B 9/34; G02B 9/60; G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 23/08;
(Continued)

(56) References Cited

U.S. PATENT DOCUMENTS

2018/0321503 A1*  11/2018  Brown ................. H04N 23/687

* cited by examiner

*Primary Examiner* — Stephone B Allen
*Assistant Examiner* — Tamara Y. Washington
(74) *Attorney, Agent, or Firm* — W&G Law Group

(57) ABSTRACT

Provided is a lens assembly, including: a first base including a first bottom plate, and first and second side plates; a lens; and first and second memory alloy wires. The first memory alloy wire includes ends connected to the first side plate and the lens. The second memory alloy wire includes ends to the second side plate and the lens. Both the first and second memory alloy wires are perpendicular to an optical axis of the lens. According to the present invention, the first and second memory alloy wires are energized to deform, to drive the lens to reciprocate between the first and second side plates to achieve optical image stabilization. Therefore, there is no problem of magnetic field interference, and stability thereof is high. Such driving leads to a simple structure and convenient assembling without an additional Hall element, and has high usage reliability in a special environment.

8 Claims, 8 Drawing Sheets

(58) Field of Classification Search
CPC .............. G02B 26/004; G02B 26/0808; G02B 26/0816; G02B 27/0911; G02B 27/644; G02B 3/14; G02B 7/021; G02B 7/025; G02B 7/18; G02B 7/24; G02B 7/28; G02B 9/00; G02B 9/24; H04N 5/23287; H04N 5/2252; H04N 5/2254; H04N 5/2329; H04N 5/2257; H04N 5/2253; H04N 5/23248; H04N 5/2328; H04N 5/225; H04N 5/232; H04N 5/23209; H04N 5/23212; H04N 5/23245; H04N 5/23258; H04N 5/23264; H04N 13/0203; H04N 13/0239; H04N 13/0296; H04N 5/222; H04N 5/228; H04N 5/23229; H04N 5/23251; H04N 5/23254; H04N 5/23261; H04N 5/23274; H04N 5/238; H04N 23/58; H04N 23/687; H04N 23/55; G03B 5/00; G03B 3/00; G03B 3/14; G03B 5/02; G03B 5/06; G03B 2205/0015; G03B 3/10; G03B 2205/0069; G03B 2205/002; G03B 2205/0007; G03B 13/36; G03B 17/02; G03B 17/04; G03B 17/14; G03B 17/12; G03B 2205/0046; G03B 2205/0053; G03B 2205/0092; F03G 7/06143

See application file for complete search history.

LENS ASSEMBLY

TECHNICAL FIELD

The present invention relates to the technical field of lens optical imaging, and more particularly, to a lens assembly.

BACKGROUND

In recent years, portable terminals such as smartphones and tablet computers have been equipped with a high-performance lens module. Such high-performance lens module generally has an auto focusing function and an optical image stabilization (OIS) function.

The optical image stabilization function of the existing camera lens module is implemented by a hall sensor sensing deviations of an OIS bracket and an optical axis and then applying a current to an OIS coil, so that the OIS coil cooperates with a magnet to prevent the OIS bracket and the optical axis from being deviated and restore the OIS bracket to an original position. In such implementation, the lens module moves under an electromagnetic force and is easily interfered by a magnetic field, and an additional hall element is required for detecting shaking of a lens barrel, which is unreliable under special circumstances. In addition, an image stabilization structure includes an OIS coil and a magnet, leading to a complicated overall structure, a high cost and a large weight. Moreover, it is needed to apply a large current to the OIS coil to form a large electromagnetic force for driving the magnet to prevent the OIS bracket and the optical axis from being deviated, leading to high power consumption. Therefore, the optical image stabilization structure of the existing lens module cannot meet the market demand for lightness, a low power consumption, a low cost and a high reliability.

Therefore, it is needed to provide a new camera lens module to solve the problems described above.

SUMMARY

The present invention aims to provide a lens assembly, which has a low magnetic field interference, a simple structure, a convenient installation, and a high stability.

The purpose of the present invention is achieved by the following technical solutions.

Provided is a lens assembly, including: a first base; a lens; a first memory alloy wire; and a second memory alloy wire. The lens is mounted to the first base in a slidable way. The first base includes a first bottom plate, a first side plate connected to the first bottom plate and provided at a side of the lens, and a second side plate connected to the first bottom plate and provided the other side of the lens. The first memory alloy wire includes an end connected to the first side plate, and another end connected to the lens. The second memory alloy wire includes an end connected to the second side plate, and another end connected to the lens; and both the first memory alloy wire and the second memory alloy wire are perpendicular to an optical axis of the lens.

As an improvement, the first memory alloy wire is parallel to and spaced apart from the second memory alloy wire; the first memory alloy wire includes an end connected to a side of the first side plate facing away from the first bottom plate, and another end connected to a side of the lens close to the second side plate; and the second memory alloy wire includes an end connected to a side of the second side plate facing away from the first bottom plate, and another end connected to a side of the lens close to the first side plate.

As an improvement, the lens assembly further includes two first connecting terminals and two second connecting terminals; wherein one of the two first connecting terminals is connected to the side of the first side plate facing away from the first bottom plate, and the other one of the two first connecting terminals is connected to the side of the lens close to the second side plate; two ends of the first memory alloy wire are connected to the two first connecting terminals, respectively; one of the two second connecting terminals is connected to the side of the second side plate facing away from the first bottom plate, and the other one of the two second connecting terminals is connected to the side of the lens close to the first side plate; and two ends of the second memory alloy wire are connected to the two second connection terminals, respectively.

As an improvement, the lens assembly further includes a first ball provided between the lens and the first base, wherein the lens is connected to the first base in a slidable way through the first ball.

As an improvement, the first side plate and the second side plate are each provided with a first recess, and two opposite sides of the lens are each provided with a first protrusion, and the two first protrusions protrude oppositely and are embedded into the two first recesses, respectively; the first recess includes a first side surface and a second side surface that are spaced apart from each other along a direction of the optical axis; the first protrusion includes a first surface facing towards the first side surface and a second surface facing towards the second side surface; the first side surface is provided with a first guiding groove, and the first surface is provided with a second guiding groove directly facing the first guiding groove; and at least one first ball is embedded between the first guiding groove and the second guiding groove.

As an improvement, a first magnet is provided on the second surface of the first protrusion, and a second magnet is provided at the second side surface of the first recess and directly faces the first magnet.

As an improvement, the lens assembly further includes a second base, a first elastic member, a second elastic member, a third memory alloy wire and a fourth memory alloy wire. The second base includes a second bottom plate, a third side plate located at a side of the second bottom plate, and a fourth side plate located at the other side of the second bottom plate; the second bottom plate, the third side plate and the fourth side plate define a second mounting groove; and the first base is mounted into the second mounting groove through the third memory alloy wire, the fourth memory alloy wire, the first elastic member, and the second elastic member, in such a manner that the first base is capable of reciprocating along a direction of the optical axis.

As an improvement, the first side plate and the third side plate are located at one side of the lens, and the second side plate and the fourth side plate are located at the other side of the lens; the third memory alloy wire extends in the direction of the optical axis and includes two ends fixedly connected to the first side plate and the third side plate, respectively; the first elastic member is parallel to the direction of the optical axis and located between the first side plate and the third side plate; the fourth memory alloy wire extends in the direction of the optical axis and includes two ends fixedly connected to the second side plate and the fourth side plate, respectively; and the second elastic member is parallel to the direction of the optical axis and located between the second side plate and the fourth side plate.

As an improvement, the lens assembly further includes a second ball provided between the first base and the second base, wherein the second base is connected to the first base in a slidable way through the second ball.

As an improvement, an outer side wall of the first side plate is provided with a first receiving groove for receiving the third side plate, a third magnet is provided at a side of the third side plate facing away from the second bottom plate, and a fourth magnet is provided at a surface of the first side plate opposite to the third magnet and directly faces the third magnet; and/or an outer side wall of the second side plate is provided with a second receiving groove for receiving the fourth side plate, a fifth magnet is provided at a side of the fourth side plate facing away from the second bottom plate, and a sixth magnet is provided at a surface of the second side plate opposite to the fifth magnet and directly faces the fifth magnet.

Compared with the related art, in the embodiment of the present invention, the first memory alloy wire and the second memory alloy wire are energized to deform to drive the lens to reciprocate between the first side plate and the second side plate, thereby achieving optical image stabilization. Therefore, there is no need for a traditional driving method using an interaction between a voice coil and a magnet, and there is no problem of magnetic field interference, and thus stability thereof is high. Moreover, such driving method is simple in structure and convenient in assembling, has no need for an additional Hall element, and has high usage reliability in a special environment. Moreover, compared with the existing image stabilization structure using a magnet cooperating with an image stabilization coil, the use of the first memory alloy wire 14 and the second memory alloy wire according to the present embodiment can significantly reduce a weight and a cost thereof. In addition, compared with the existing image stabilization structure using a magnet cooperating with an image stabilization coil, the use of the first memory alloy wire and the second memory alloy wire according to the present embodiment can pull the lens as long as a small amount of current is applied to the first memory alloy wire and the second memory alloy wire, thereby achieving an optical image stabilization effect while effectively reducing power consumption thereof.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will be further described in the following with reference to the accompany drawings and embodiments.

Figure 1:
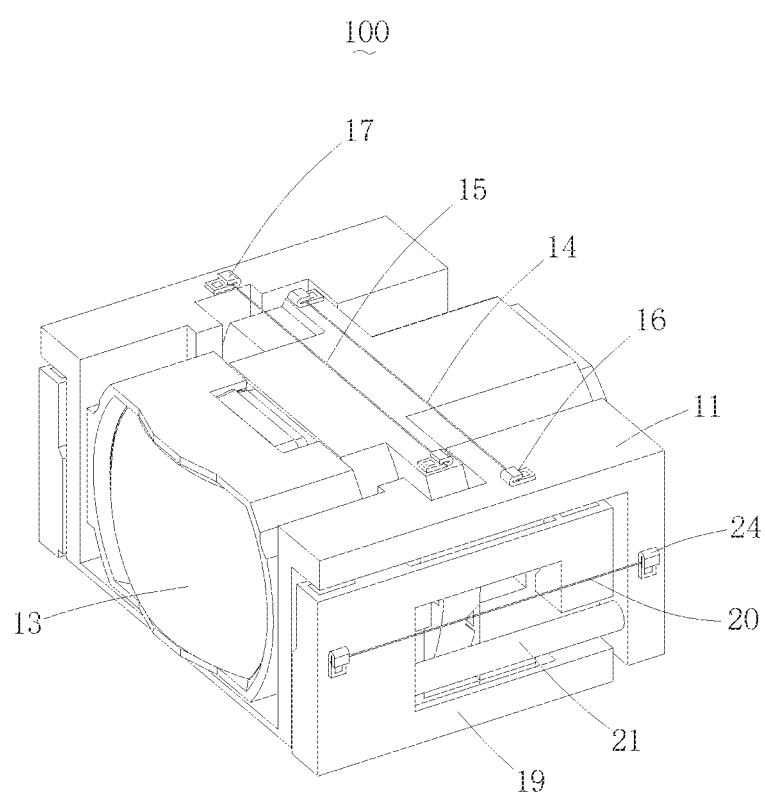
FIG. 1 is a schematic diagram of a structure of a lens assembly according to an embodiment of the present invention.
Figure 2:
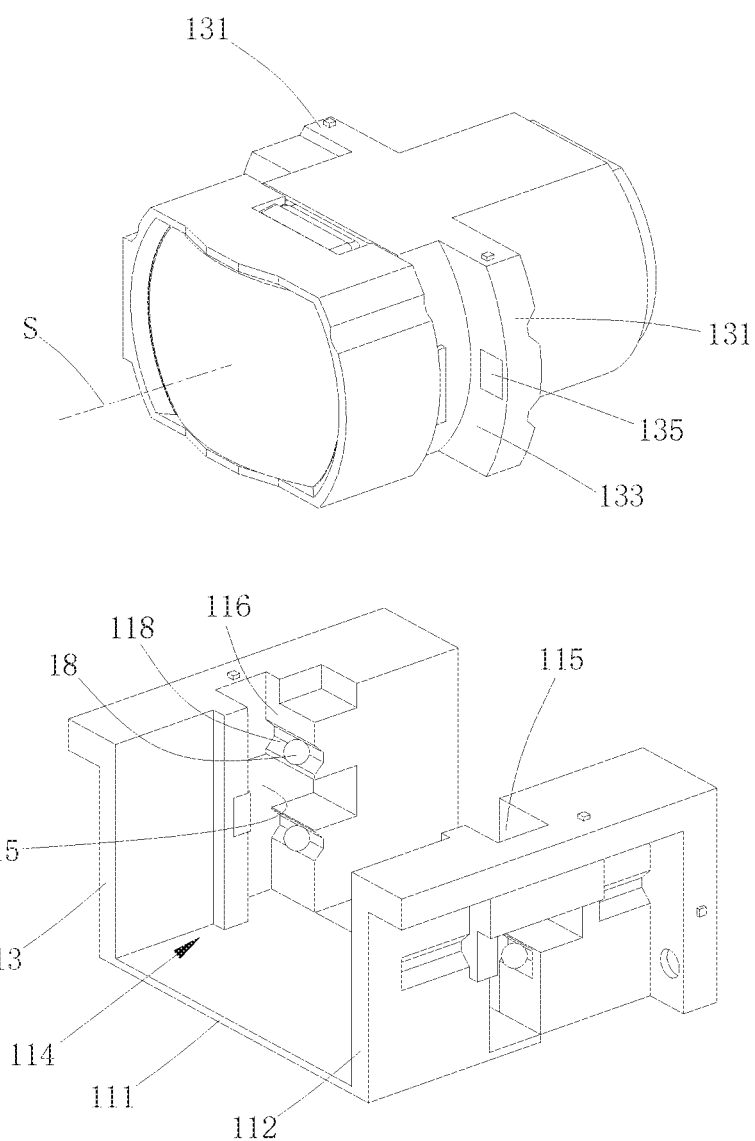
FIG. 2 is a schematic diagram of structures of a lens and a first base from a first perspective.
Figure 3:
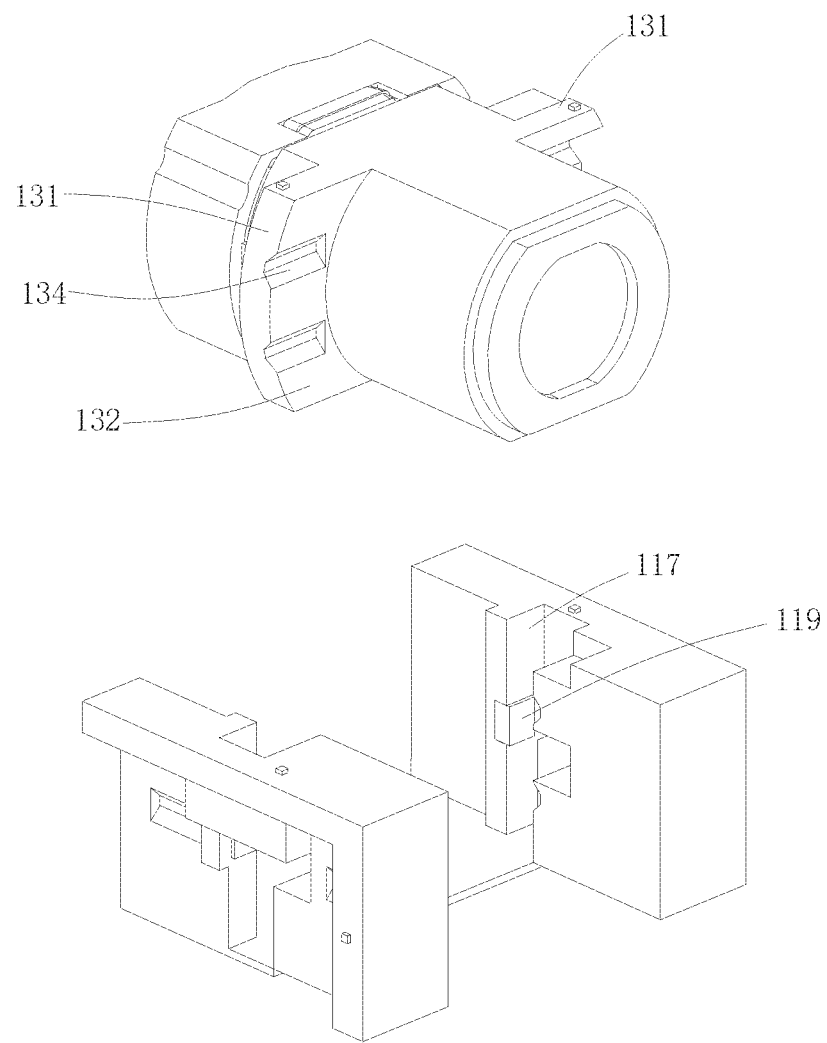
FIG. 3 is a schematic diagram of structures of a lens and a first base from a second perspective.
Figure 4:
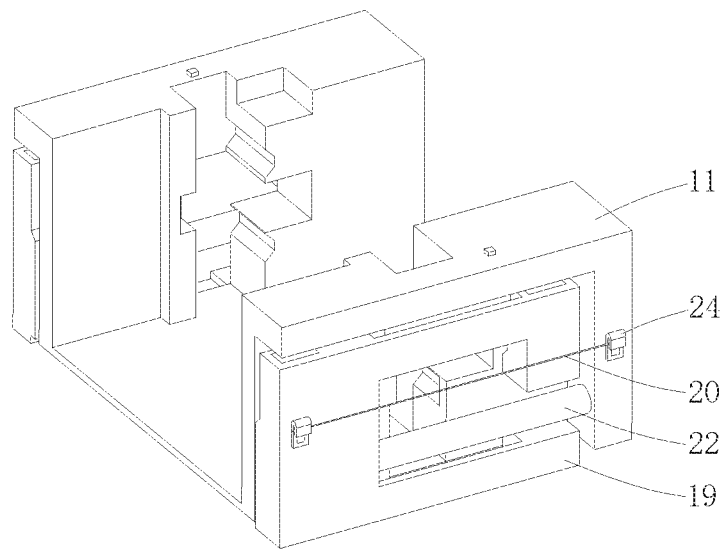
FIG. 4 is a schematic diagram of structures of a first base and a second base, which are cooperating with each other, from a first perspective according to an embodiment of the present invention.
Figure 5:
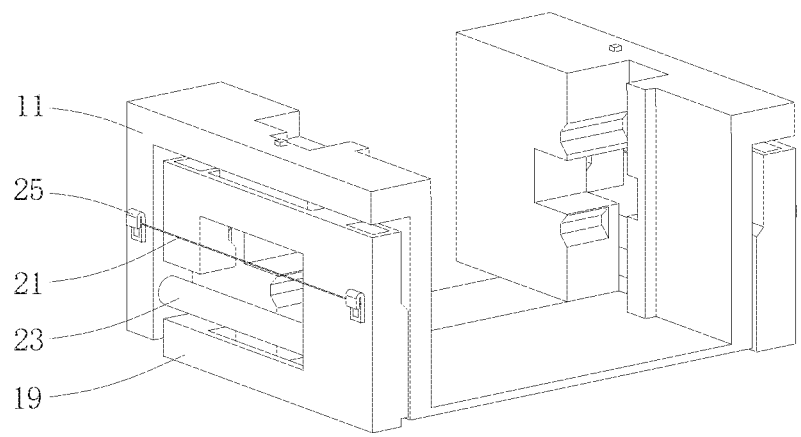
FIG. 5 is a schematic diagram of structures of a first base and a second base, which are cooperating with each other, from a second perspective according to an embodiment of the present invention.
Figure 6:
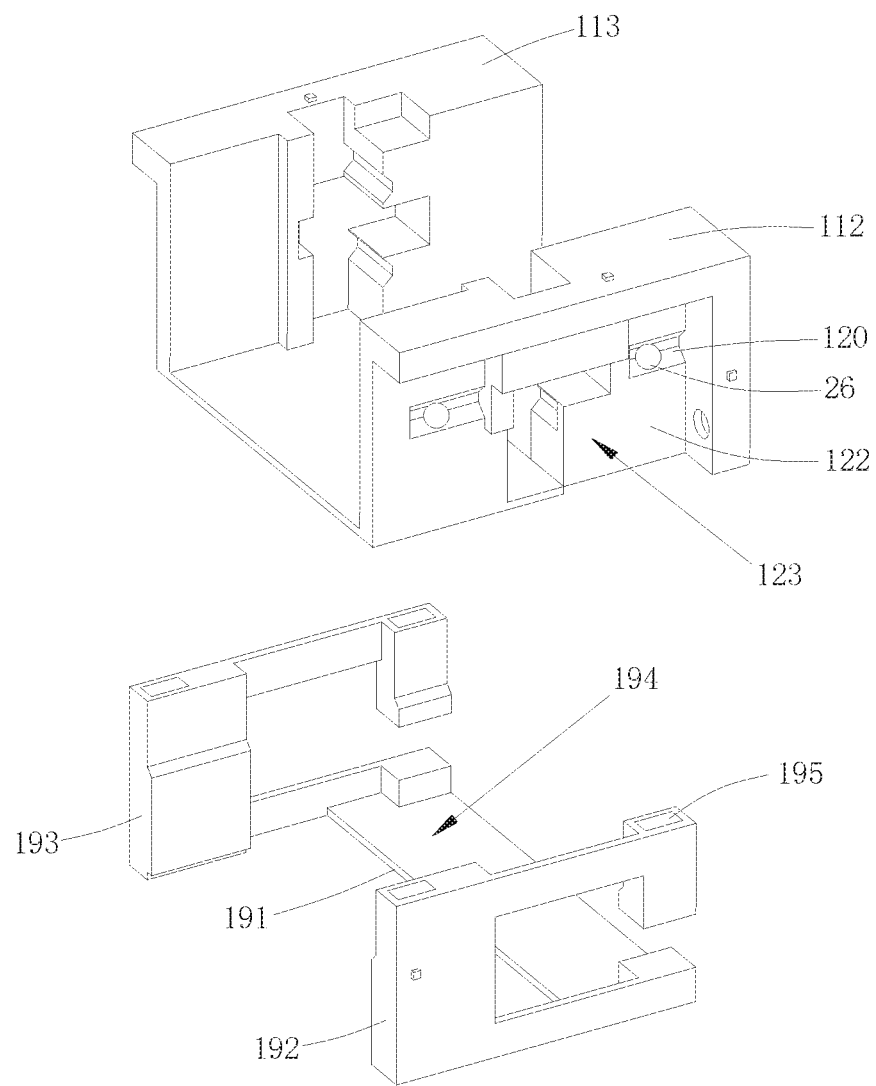
FIG. 6 is an exploded view showing structures of a first base and a second base from a first perspective according to an embodiment of the present invention.
Figure 7:
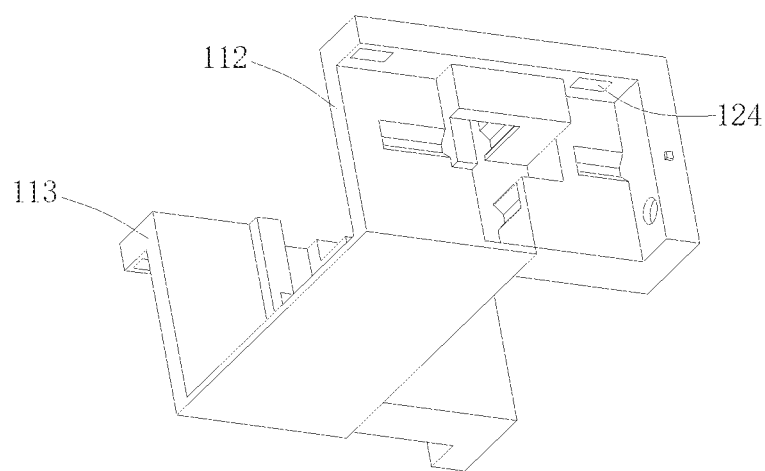
FIG. 7 is a schematic diagram of a structure of a first base from a first perspective according to an embodiment of the present invention.
Figure 8:
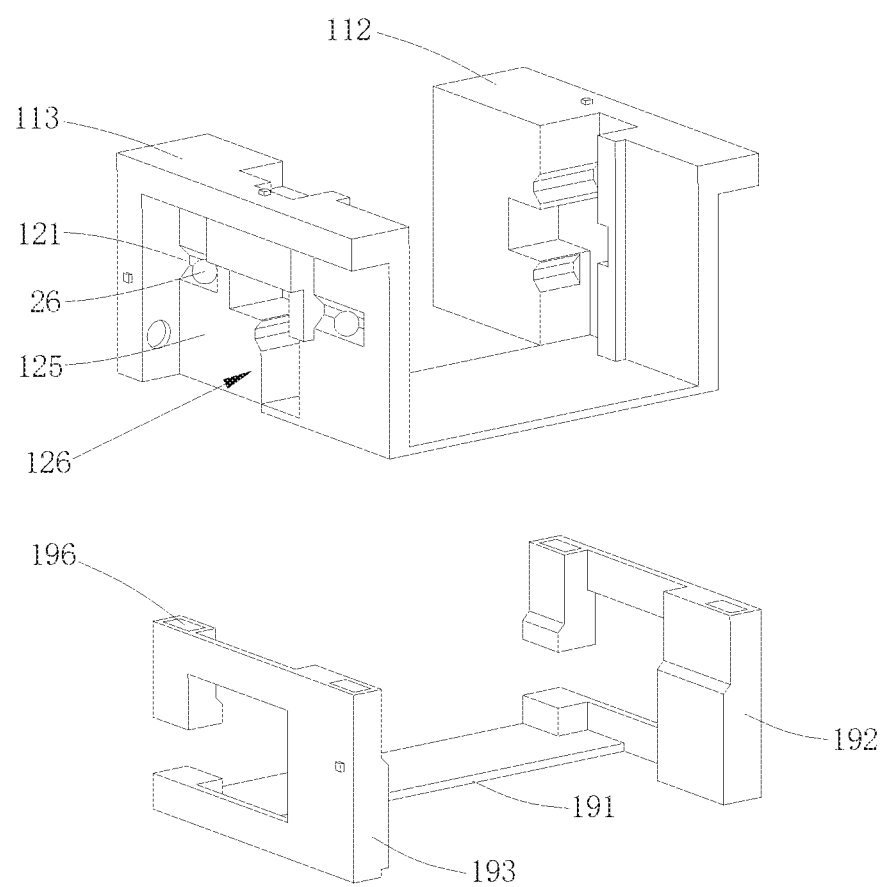
FIG. 8 is an exploded view showing structures of a first base and a second base from a second perspective according to an embodiment of the present invention.
Figure 9:
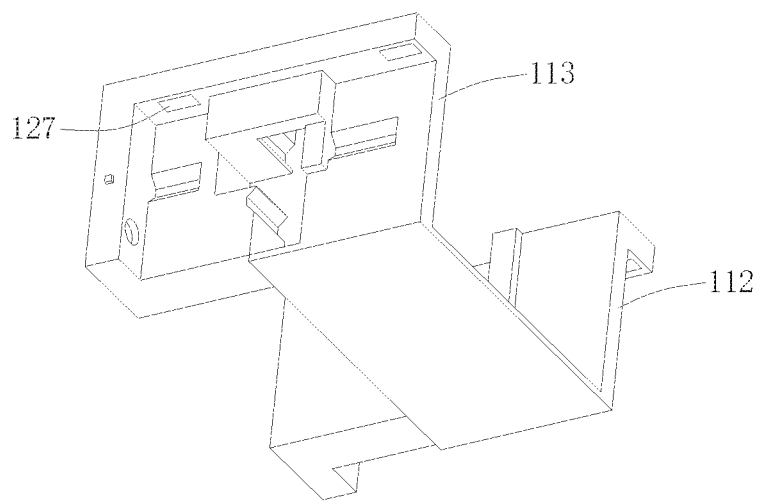
FIG. 9 is a schematic diagram of a structure of a first base from a second perspective according to an embodiment of the present invention.

With reference to FIG. 1 to FIG. 3, an embodiment of the present invention provides a lens assembly 100, which includes a first base 11, a lens 13, a first memory alloy wire 14 and a second memory alloy wire 15. The lens 13 is mounted to the first base 11 in a slidable way. The first base 11 includes a first bottom plate 111, a first side plate 112 provided at a side of the first bottom plate 111, and a second side plate 113 provided at the other side of the first bottom plate 111. The first bottom plate 111, the first side plate 112, and the second side plate 113 define a first mounting groove 114. The lens 13 is mounted into the first mounting groove 114, and the first side plate 112 and the second side plate 113 are located at two opposite sides of the lens 14, respectively. The first memory alloy wire 14 and the second memory alloy wire 15 are both suspended above the lens 13. The first memory alloy wire 14 includes an end connected to a side of the first side plate 112 facing away from the first bottom plate 111, and another end connected to a side of the lens 13 close to the second side plate 113. The second memory alloy wire 15 includes an end connected to a side of the second side plate 113 facing away from the first bottom plate 111, and another end connected to a side of the lens 13 close to the first side plate 112. Both the first memory alloy wire 14 and the second memory alloy wire 15 are perpendicular to an optical axis S of the lens 13.

When there is no deviation, the lens 13 is located at an initial position of the first base 12, and the first memory alloy wire 14 and the second memory alloy wire 15 are in a loose state. When the lens 13 is deviated towards the first side plate 112 or the second side plate 113, for example, when the lens 13 is deviated towards the second side plate 113, the first memory alloy wire 14 is elongated. When a current is applied to the first memory alloy wire 14, so that a temperature thereof increases, the first memory alloy wire 14 is shortened due to its own physical characteristics, thereby pulling the lens 13 back to the original position. In this way, optical image stabilization of the lens 13 can be achieved, thereby improving an imaging quality of the lens 13.

Compared with the related art, in this embodiment, the first memory alloy wire 14 and the second memory alloy wire 15 are energized to deform, so as to drive the lens 13 to reciprocate between the first side plate 112 and the second side plate 113 to achieve optical image stabilization. Therefore, there is no need for a traditional driving method using an interaction between the voice coil and the magnet, and there is no problem of magnetic field interference, and thus stability thereof is high. Moreover, such driving method is simple in structure and convenient in assembling, has no need for an additional Hall element, and has high usage reliability in a special environment. Moreover, compared with the existing image stabilization structure using a magnet cooperating with an image stabilization coil, the use of the first memory alloy wire 14 and the second memory alloy wire 15 according to the present embodiment can significantly reduce a weight and a cost thereof. In addition, compared with the existing image stabilization structure using a magnet cooperating with an image stabilization coil, the use of the first memory alloy wire 14 and the second memory alloy wire 15 according to the present embodiment can pull the lens 13 as long as a small amount of current is applied to the first memory alloy wire 14 and the second memory alloy wire 15, thereby achieving an optical image stabilization effect while effectively reducing power consumption thereof.

It should be understood that the first memory alloy wire 14 and the second memory alloy wire 15 are not limited to being parallel to and spaced apart from each other. For example, it is also possible that the first memory alloy wire 14 and the second memory alloy wire 15 are arranged coaxially (the first memory alloy wire 14 includes one end connected to the first side plate 112, an another end connected to a middle portion of the lens 13; and similarly, the second memory alloy wire 15 includes one end connected to the second side plate 113, and another end connected to a middle portion of the lens 13), as long as the first memory alloy wire 14 and the second memory alloy wire 15 can pull the lens 13 to reciprocate between the first side plate 112 and the second side plate 113 to achieve optical image stabilization. Further, one end of the first memory alloy 13 is not limited to being connected to the side of the first side plate 112 facing away from the first bottom plate 111, but can be connected to any portion of the first side plate 112, and the other end is connected to the lens 13, as long as the first memory alloy 13 has a sufficient length for pulling the lens 13 to move between the first side plate 112 and the second side plate 113.

In an example, the first memory alloy wire 14 and the second memory alloy wire 15 are each made of a nickel-titanium alloy material. By controlling an amount of electricity flowing in the first memory alloy wire 14 and the second memory alloy wire 15, heat generated in the first memory alloy wire 14 and the second memory alloy wire 15 can be controlled, thereby controlling shortening amounts of the first memory alloy wire 14 and the second memory alloy wire 15.

It should be noted that due to respective physical characteristics of the first memory alloy wire 14 and the second memory alloy wire 15, when the first memory alloy wire 14 and the second memory alloy wire 15 are shortened, respective resistance values will change. Therefore, it is possible to detect whether the lens is deviated by providing a detection circuit and a chip. In an example, the detection circuit detects a magnitude of a current flowing through the first memory alloy wire 14 and the second memory alloy wire 15 and transmits a signal to the chip. The chip may calculate the respective resistance values of the first memory alloy wire 14 and the second memory alloy wire 15 based on the detected current signal. Then, the chip obtains respective length values of the first memory alloy wire 14 and the second memory alloy wire 15 based on a corresponding relation between the respective resistance values and the respective lengths of the first memory alloy wire 14 and the second memory alloy wire 15, thereby determining whether the first memory alloy wire 14 and the second memory alloy wire 15 are shortened and how much shortened amounts are. In this way, the amount of current flowing into the first memory alloy wire 14 and the second memory alloy wire 15 can be controlled, so as to pull the lens 13 back to the initial position more accurately.

As an improvement of this embodiment, the lens assembly 100 further includes two first connecting terminals 16 and two second connecting terminals 17. One of the two first connecting terminals 16 is connected to a side of the first side plate 112 facing away from the first bottom plate 111, and the other one of two first connecting terminals is connected to a side of the lens 13 close to the second side plate 113. Two ends of the first memory alloy wire 14 are respectively connected to the two first connecting terminals 16. One of the two second connecting terminals 17 is connected to a side of the second side plate 113 facing away from the first bottom plate 111, and the other one of the two second connecting terminals 17 is connected to a side of the lens 13 close to the first side plate 112. Two ends of the second memory alloy wire 15 are respectively connected to the two second connecting terminals 17. By providing the first connecting terminal 16 and the second connecting terminal 17, on the one hand, it is convenient to connect the first memory alloy wire 14 with the first side plate 112 and to connect the second memory alloy wire 15 with the second side plate 113, and on the other hand, it is convenient to connect the first memory alloy wire 14 and the second memory alloy wire 15 with an external power supply.

It is understood that the lens assembly 100 may not be provided with the first connecting terminal 16 and the second connecting terminal 17, and the first memory alloy wire 14 and the second memory alloy wire 15 may be fixed between the lens 13 and the first side plate 112 and the second side plate 113 by other connection ways.

As an improvement of this embodiment, the lens assembly 10 further includes a first ball 18 provided between the lens 13 and the first base 11. By providing the first ball 18, a frictional force generated when the lens 13 is moving between the first side plate 112 and the second side plate 113 can be reduced, so that movement of the lens 13 is smoother, and the optical image stabilization response is more sensitive.

As an improvement of this embodiment, the first side plate 112 and the second side plate 113 are each provided with a first recess 115, and two opposite sides of the lens 13 are each provided with a first protrusion 131, and the two first protrusions 131 protrude in opposite directions and are embedded into the two first recesses 115, respectively. Each first recess 115 includes a first side surface 116 and a second side surface 117 that are spaced apart from each other along a direction of the optical axis S. Each first protrusion 131 includes a first surface 132 facing towards the first side surface 116 and a second surface 133 facing towards the second side surface 117. The first side surface 116 is provided with a first guiding groove 118, and the first surface 132 is provided with a second guiding groove 134 directly facing the first guiding groove 118. At least one first ball 18 is embedded between the first guiding groove 118 and the second guiding groove 134. The first guiding groove 118 is perpendicular to the direction of the optical axis S and is parallel to the first bottom plate 111.

As an improvement of this embodiment, two first guiding grooves 118 are provided, and the two first guiding grooves 118 are parallel to and spaced apart from each other in a direction perpendicular to the first bottom plate 111. Two second guiding grooves 134 are provided, and the two second guiding grooves 134 are parallel to and spaced apart from each other in the direction perpendicular to the first bottom plate 111. The two second guiding grooves 134 directly face the two first guiding grooves 118, respectively. At least one first ball 18 is embedded between each first guiding groove 118 and the corresponding second guiding groove before groove 134. By providing the two first guiding grooves 118 and the corresponding two second guiding grooves 134, an operation of the lens 13 can be more stable.

As an improvement of this embodiment, a first magnet 135 is provided on the second surface 1333 of the first protrusion 131, and a second magnet 119 opposite to the first magnet 135 for achieving magnetic attraction with the first magnet 135 is provided at the second side surface 117 of the first recess 115. The first magnet 135 and the second magnet 119 are mainly used to cooperate with the first memory alloy wire 14 or the second memory alloy wire 15 to restore the deviated lens 13 to the initial position. Initially, there is no deviation for the lens 13, and the first magnet 135 directly faces the second magnet 119. When the lens 13 is deviated, for example, when the lens 13 is deviated towards the second side plate 113, the first memory alloy wire 14 is elongated, and the first magnet 135 is misaligned with the second magnet 119. Then, the first memory alloy wire 14 is energized to be shortened, and cooperate with a mutual magnetic force between the first magnet 135 and the second magnet 119 to restore the lens 13 to the initial position.

With reference to FIG. 1, and FIG. 4 to FIG. 7, as an improvement of this embodiment, the lens assembly 100 further includes a second base 19, a third memory alloy wire 20, a fourth memory alloy wire 21, a first elastic member 22 and a second elastic member 23. The first base 11 is mounted to the second base 19 and slidable in a direction parallel to the optical axis S. The second base 19 includes a second bottom plate 191, a third side plate 192 provided at a side of the second bottom plate 191, and a fourth side plate 193 provided at the other side of the second bottom plate 191. The second bottom plate 191, the third side plate 192, and the fourth side plate 193 define a second mounting groove 194. The first base 11 is mounted into the second mounting groove 194. The third side plate 192 is located at a side of the first side plate 112 facing away from the lens 12, and the fourth side plate 193 is located at a side of the second side plate 113 facing away from the lens. The third memory alloy wire 20 extends in a direction parallel to the optical axis S and includes two ends connected to the first side plate 112 and the third side plate 192, respectively. The first elastic member 22 extends in the direction of the optical axis S and is compressed between the first side plate 112 and the third side plate 192. The fourth memory alloy wire 21 extends in the direction of the optical axis S and includes two ends connected to the second side plate 113 and the fourth side plate 193, respectively. The second elastic member 23 extends in a direction parallel to the optical axis S and is compressed between the second side plate 113 and the fourth side plate 193.

Initially, the first base 11 is located at an initial position of the second base 19, that is, the lens 13 is located at a preset initial position. When focusing, a current is applied to the third memory alloy wire 20 and the fourth memory alloy wire 21, the third memory alloy wire 20 and the fourth memory alloy wire 21 are heated, and respective lengths thereof are shortened, thereby pulling the first base 11 to move relative to the second base 13 along the direction of the optical axis S of the lens 13 to achieve focusing the lens 13. After the focusing is completed, power is off, and a restoring structure restores the lens 13 together with the first base 11 to the initial position.

Compared with the related art, in this embodiment, the third memory alloy wire 20 and the fourth memory alloy wire 21 are energized to deform to cooperate with the first elastic member 22 and the second elastic member 23 to drive the lens 13 to reciprocate along the direction of the optical axis S to achieve auto focusing of the lens 13. There is no need for a traditional driving method using an interaction between the voice coil and the magnet, and there is no problem of magnetic field interference, and thus stability thereof is high. Moreover, such driving method is simple in structure and convenient in assembling, has no need for an additional Hall element, and has high usage reliability in a special environment. Moreover, compared with the existing image stabilization structure using a magnet cooperating with an image stabilization coil, the third memory alloy wire 20 and the fourth memory alloy wire 21 used in this embodiment can significantly reduce a weight and a cost thereof. In addition, compared with the existing image stabilization structure using a magnet cooperating with an image stabilization coil, the third memory alloy wire 20 and the fourth memory alloy wire 21 used in this embodiment can pull the first base 11 to move as long as a small amount of current is applied to the third memory alloy wire 20 and the fourth memory alloy wire 21, thereby achieving an auto focusing effect while effectively reducing power consumption thereof.

As an improvement of this embodiment, the lens assembly 100 further includes two third connecting terminals 24 and two fourth connecting terminals 25. The two third connecting terminals 24 are mounted to the first side plate 112 and the third side plate 192, respectively. Two ends of the third memory alloy wire 20 are connected to the two third connecting terminals 24, respectively. The two fourth connecting terminals 25 are mounted to the second side plate 113 and the fourth side plate 193, respectively. Two ends of the fourth memory alloy wire 21 are connected to the two fourth connecting terminals 25, respectively As an improvement of this embodiment, the lens assembly 100 further includes a second ball 26 provided between the first base 11 and the second base 19, and the first base 11 is connected to the second base 19 in a slidable way through the second ball 26.

As an improvement of this embodiment, an outer side wall of the first side plate 112 is provided with a third guiding groove 120 extending along the direction of the optical axis S, and an outer side wall of the second side plate 113 is provided with a fourth guiding groove 121 extending along the direction of the optical axis S. Each of the third guide groove 120 and the fourth guide groove 121 has at least one second ball 26 embedded therein.

With reference to FIG. 6 to FIG. 9, As an improvement of this embodiment, a first receiving groove 123 is provided at the outer side wall 122 of the first side plate 112 for receiving the third side plate 192, and a third magnet 195 is provided at a side of the third side plate 192 facing away from the second bottom plate 191. A fourth magnet 124 for achieving magnetic attraction with the third magnet 195 is provided at a surface of the first side plate 112 opposite to the third magnet 195, and directly faces the third magnet 195. The third magnet 195 and the fourth magnet 124 are mainly used to cooperate with the first elastic member 22 to restore the deviated first base 11 to the initial position. Initially, there is no deviation for the first base 11, the first base 11 is located at the initial position of the second base 19, and the third magnet 195 directly faces the fourth magnet 124. When performing focusing, the fourth memory alloy wire 21 is energized to be shortened and the first base 11 is deviated relative to the second base 19, the third magnet 195 is deviated relative to the fourth magnet 124, and the first elastic member 22 is in a compressed state. After the focusing is completed, power is off, and the first elastic member 22 uses its elastic force to cooperate with a mutual magnetic force between the third magnet 195 and the fourth magnet 124 to restore the first base 11 to the initial position.

As an improvement of this embodiment, a second receiving groove 126 is provided at the outer side wall 125 of the second side plate 113 for receiving the fourth side plate 193, and a fifth magnet 196 is provided at a side of the fourth side plate 193 facing away from the second bottom plate 191. A sixth magnet 127 for achieving magnetic attraction with the fifth magnet 196 is provided at a surface of the second side plate 113 opposite to the fifth magnet 196, and directly faces the fifth magnet 196. The fifth magnet 196 and the sixth magnet 127 are mainly used to cooperate with the second elastic member 23 to restore the deviated first base 11 to the initial position. Initially, there is no deviation for the first base 11, the first base 11 is located at the initial position of the second base 19, and the fifth magnet 196 directly faces the sixth magnet 127. When performing focusing, the fourth memory alloy wire 21 is energized to be shortened and the first base 11 is deviated relative to the second base 19, the fifth magnet 196 is deviated relative to the sixth magnet 127, and the second elastic member 23 is in a compressed state. After the focusing is completed, power is off, and the second elastic member 23 uses its elastic force to cooperate with a mutual magnetic force between the fifth magnet 196 and the sixth magnet 127 to restore the first base 11 to the initial position.

The above description merely illustrates some embodiments of the present invention. It should be noted that those skilled in the art can make improvements without departing from a creative concept of the present invention, but all these improvements shall fall into a scope of the present invention.

What is claimed is:

1. A lens assembly, comprising:
   a first base;
   a lens;
   a first ball provided between the lens and the first base;
   a first memory alloy wire; and
   a second memory alloy wire,
   wherein the lens is mounted to the first base in a slidable way through the first ball, and the first base comprises a first bottom plate, a first side plate connected to the first bottom plate and provided at a side of the lens, and a second side plate connected to the first bottom plate and provided the other side of the lens; the first memory alloy wire comprises an end connected to the first side plate, and another end connected to the lens; the second memory alloy wire comprises an end connected to the second side plate, and another end connected to the lens; and both the first memory alloy wire and the second memory alloy wire are perpendicular to an optical axis of the lens;
   the first side plate and the second side plate are each provided with a first recess, and two opposite sides of the lens are each provided with a first protrusion, and the two first protrusions protrude oppositely and are embedded into the two first recesses, respectively; the first recess comprises a first side surface and a second side surface that are spaced apart from each other along a direction of the optical axis; the first protrusion comprises a first surface facing towards the first side surface and a second surface facing towards the second side surface; the first side surface is provided with a first guiding groove, and the first surface is provided with a second guiding groove directly facing the first guiding groove; and at least one first ball is embedded between the first guiding groove and the second guiding groove.

2. The lens assembly as described in claim 1, wherein the first memory alloy wire is parallel to and spaced apart from the second memory alloy wire; the first memory alloy wire comprises an end connected to a side of the first side plate facing away from the first bottom plate, and another end connected to a side of the lens close to the second side plate; and the second memory alloy wire comprises an end connected to a side of the second side plate facing away from the first bottom plate, and another end connected to a side of the lens close to the first side plate.

3. The lens assembly as described in claim 2, further comprising two first connecting terminals and two second connecting terminals; wherein one of the two first connecting terminals is connected to the side of the first side plate facing away from the first bottom plate, and the other one of the two first connecting terminals is connected to the side of the lens close to the second side plate; two ends of the first memory alloy wire are connected to the two first connecting terminals, respectively; one of the two second connecting terminals is connected to the side of the second side plate facing away from the first bottom plate, and the other one of the two second connecting terminals is connected to the side of the lens close to the first side plate; and two ends of the second memory alloy wire are connected to the two second connection terminals, respectively.

4. The lens assembly as described in claim 1, wherein a first magnet is provided on the second surface of the first protrusion, and a second magnet is provided at the second side surface of the first recess and directly faces the first magnet.

5. The lens assembly as described in claim 1, further comprising a second base, a first elastic member, a second elastic member, a third memory alloy wire and a fourth memory alloy wire,
   wherein the second base comprises a second bottom plate, a third side plate located at a side of the second bottom plate, and a fourth side plate located at the other side of the second bottom plate; the second bottom plate, the third side plate and the fourth side plate define a second mounting groove; and the first base is mounted into the second mounting groove through the third memory alloy wire, the fourth memory alloy wire, the first elastic member, and the second elastic member, in such a manner that the first base is capable of reciprocating along a direction of the optical axis.

6. The lens assembly as described in claim 5, wherein the first side plate and the third side plate are located at one side of the lens, and the second side plate and the fourth side plate are located at the other side of the lens; the third memory alloy wire extends in the direction of the optical axis and comprises two ends fixedly connected to the first side plate and the third side plate, respectively; the first elastic member is parallel to the direction of the optical axis and located between the first side plate and the third side plate; the fourth memory alloy wire extends in the direction of the optical axis and comprises two ends fixedly connected to the second side plate and the fourth side plate, respectively; and the second elastic member is parallel to the direction of the optical axis and located between the second side plate and the fourth side plate.

7. The lens assembly as described in claim 5, further comprising a second ball provided between the first base and the second base, wherein the second base is connected to the first base in a slidable way through the second ball.

8. The lens assembly as described in claim 5, wherein an outer side wall of the first side plate is provided with a first receiving groove for receiving the third side plate, a third magnet is provided at a side of the third side plate facing away from the second bottom plate, and a fourth magnet is provided at a surface of the first side plate opposite to the third magnet and directly faces the third magnet; and/or an outer side wall of the second side plate is provided with a second receiving groove for receiving the fourth side plate, a fifth magnet is provided at a side of the fourth side plate facing away from the second bottom plate, and a sixth magnet is provided at a surface of the second side plate opposite to the fifth magnet and directly faces the fifth magnet.

* * * * *